Patented July 8, 1924.

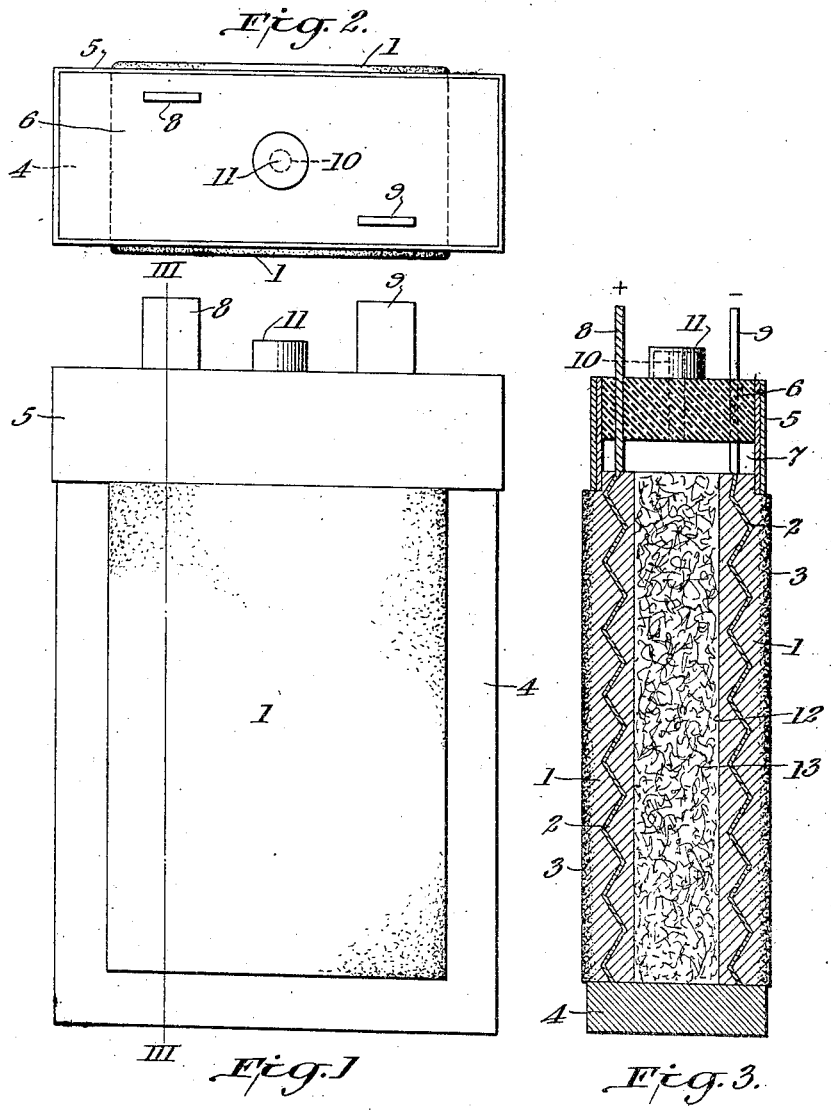

1,500,222

UNITED STATES PATENT OFFICE.

RAYMOND C. BENNER, OF BAYSIDE, AND HARRY F. FRENCH, OF FLUSHING, NEW YORK, ASSIGNORS, BY MESNE ASSIGNMENTS, TO THE PREST-O-LITE COMPANY, INC., OF NEW YORK, N. Y., A CORPORATION OF NEW YORK.

STORAGE CELL OR BATTERY.

Application filed May 5, 1922. Serial No. 559,607.

*To all whom it may concern:*

Be it known that we, RAYMOND C. BENNER and HARRY F. FRENCH, citizens of the United States, residing at Bayside and Flushing, in the county of Queens and State of New York, have invented certain new and useful Improvements in Storage Cells or Batteries, of which the following is a specification.

This invention relates to storage cells and batteries, particularly those of the miniature type adapted for use in flashlights or other electrical apparatus in which a small, readily portable storage cell or battery is desirable.

The principal object of the invention is to provide a light weight battery capable of giving good service and of being manufactured at small cost. While the battery may advantageously be recharged, its cost is sufficiently low to make it economical for use for a single discharge only.

This object, and others which will be apparent from the succeeding description, are attained by a battery construction in which the active material forms a part or all of the container for the electrodes and electrolyte. In the preferred form of the invention, slabs of active material are impregnated on one surface with an acid resistant, waterproof insulating material, and are used in the construction of the battery container. Containers formed in this way have ample strength for all requirements made upon storage batteries of the miniature type.

The invention will be described in detail in connection with the accompanying drawing, in which—

Fig. 1 is a front elevation of a battery having a container comprising impregnated active material.

Fig. 2 is a top plan view of the same, and

Fig. 3 is a vertical, transverse section on line III—III, Fig. 1.

Referring to the drawings, reference numeral 1 denotes slabs of active material supported on conductive plates or grids 2 centrally embedded therein. The active material is impregnated with an acid-resistant, waterproof material, forming an exterior stratum or layer, as indicated at 3. A solution of celluloid in a volatile solvent is the preferred impregnating agent. The celluloid solution should be allowed to dry and one or more additional applications of the solution, with intermediate drying periods, should be made, in order to secure a waterproof coating of adequate thickness.

The slabs 1 may be set in a rectangular frame 4 of celluloid, or the like, with their impregnated faces turned outwardly. A suitable electrolyte-proof adhesive may be used to secure the slabs to the frame. In this manner a water-tight container is provided, the frame 4 forming the bottom and ends and the active material slabs 1 forming the sides. A cover comprising a celluloid collar 5 and a seal 6 of pitch or the like closes the battery. An air space 7 may be left beneath the seal 6. Lugs 8 and 9 on conductors 2 protrude through the seal, and the latter is also pierced by an opening 10, having a cap 11. Through the opening, electrolyte solution may be introduced into central space 12. An absorbent 13 will usually be supplied to take up the electrolyte. The preferred absorbent is a composition of glass wool and organic material, as described and claimed in our application, Serial No. 552,834 filed April 11, 1922 but any suitable absorbent may be used.

In the specific form of the invention illustrated, one positive and one negative electrode are provided, but the principle of impregnating the active material to enable it to serve as a container wall is obviously applicable to cells in which various other arrangements of electrodes are adopted. We prefer to employ the invention in storage batteries of the lead-sulfuric acid-lead dioxid type, but it is not limited thereto.

Instead of impregnating the active material with celluloid, we may use any other material capable of resisting the action of the electrolyte and of preventing its exudation to the exterior of the container. For example, rubber, phenolic condensation products, or asphalt may be used. The frame 4 may be made of hard rubber or other acid resistant material, instead of celluloid. Various other changes in the specific materials and construction, given by way of illustration herein, may be made within the scope of the appended claims.

We claim:—

1. A storage cell or battery container comprising a wall formed of plumbic active material having a portion adapted for exposure to electrolyte, and an acid-resistant, impervious substance impregnating the exposed outer surface of said wall and preventing passage of electrolyte therethrough.

2. A storage cell or battery container comprising a frame of strong, rigid material, slabs of active material set in the frame to form the sides thereof, an acid-resistant, impervious substance impregnating the exposed outer surfaces of said slabs, conductors in contact with the active material, and means for sealing the container.

In testimony whereof, we affix our signatures.

RAYMOND C. BENNER.
HARRY F. FRENCH